United States Patent [19]
Leick

[11] Patent Number: 5,477,593
[45] Date of Patent: Dec. 26, 1995

[54] LACE LOCKING DEVICE

[75] Inventor: Patrick Leick, Villaz, France

[73] Assignee: Salomon S.A., Metz-Tessy, France

[21] Appl. No.: 247,893

[22] Filed: May 23, 1994

[30] Foreign Application Priority Data

Jun. 21, 1993 [FR] France .................. 93 07715

[51] Int. Cl.⁶ .................................. F16G 11/00
[52] U.S. Cl. .................. 24/712.5; 24/712.1; 24/713.5; 24/136 A
[58] Field of Search ............... 24/712.5, 712.1, 24/713, 713.5, 115 G, 115 L, 25, 136 A, 662, 663

[56] References Cited

U.S. PATENT DOCUMENTS

| 307,806 | 11/1884 | Saller | 24/136 A |
|---|---|---|---|
| 948,071 | 2/1910 | Lubeck | 24/712.5 |
| 1,047,782 | 12/1912 | German | 24/662 |
| 2,200,895 | 5/1940 | Rio | 24/117 |
| 2,236,506 | 4/1941 | Hirsch | 24/712.5 |
| 3,007,220 | 11/1961 | Hafner et al. | 24/126 |
| 3,551,963 | 1/1971 | Mosher, Jr. et al. | 24/662 |
| 3,564,670 | 2/1971 | Bengtsson | 24/126 |
| 3,965,544 | 6/1976 | Boden | 24/136 R |
| 4,665,590 | 5/1987 | Udelhofen et al. | 24/115 H |
| 4,765,034 | 8/1988 | Kasai | 24/136 R |
| 4,788,755 | 12/1988 | Kasai | 24/136 A |
| 4,807,333 | 2/1989 | Boden | 24/117 |
| 4,878,269 | 11/1989 | Anscher et al. | 24/115 G |

FOREIGN PATENT DOCUMENTS

| 1272514 | 7/1990 | Canada . |
|---|---|---|
| 0248290 | 12/1987 | European Pat. Off. . |
| 1924757 | 9/1965 | Germany . |
| 2188974 | 10/1987 | United Kingdom . |
| WO88/02077 | 3/1988 | WIPO . |

Primary Examiner—Victor N. Sakran
Attorney, Agent, or Firm—Sandler, Greenblum, & Bernstein

[57] ABSTRACT

The locking device is of the type acting for at least one lace, especially including a pusher defining the axis of rotation of a blocking member, also including a hollow body of which a cavity defines, on the one hand, at least a path for passage of each strand of the lace, and on the other hand, a housing for the locking member, the locking member being of a circular shape and rotationally free about the translationally mobile axis. The device operates by cooperation of the locking member with each path for locking each strand of the lace by wedging, such that the locking member is elastically biased in a locking direction of the strand(s) of lace by action on its axis of rotation.

19 Claims, 5 Drawing Sheets

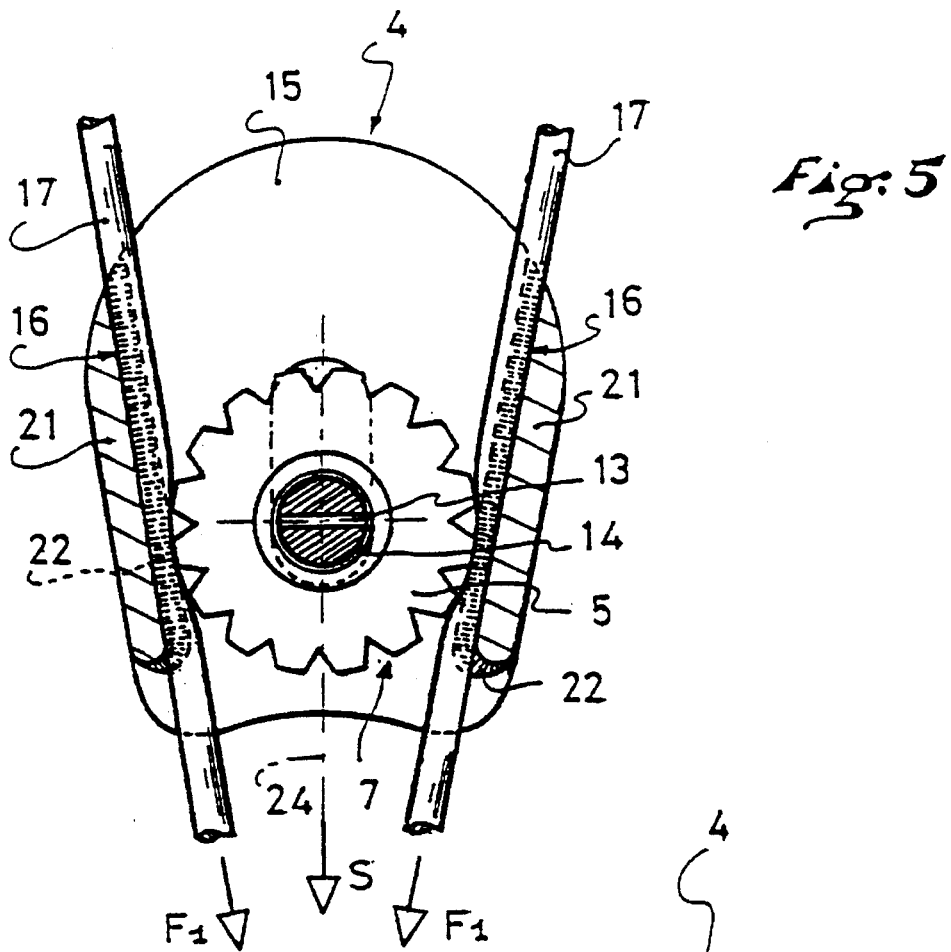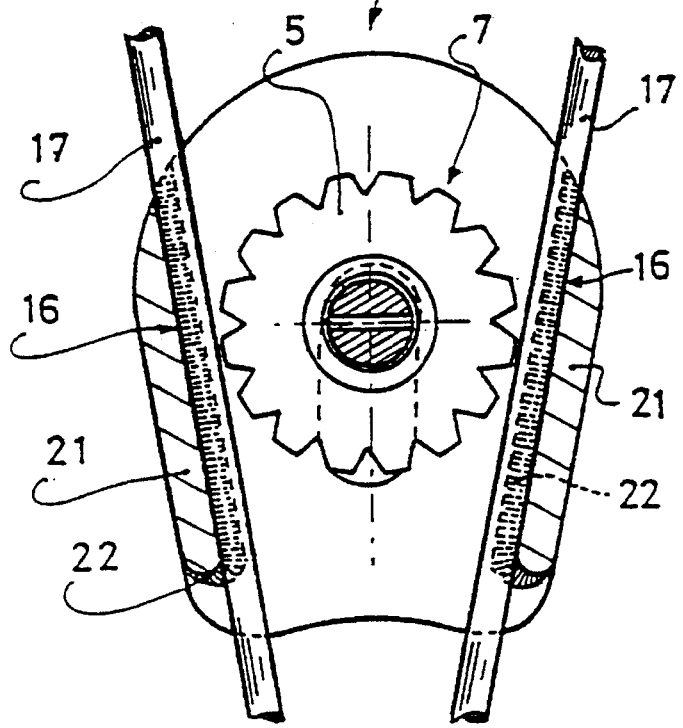

5,477,593

LACE LOCKING DEVICE

BACKGROUND OF THE INVENTION

1. Field of the Invention

The invention is related to a mechanical device for locking in place flexible strands such as cables, ropes, laces, or any other similar product.

More specifically, the invention pertains to the locking of boot laces. Yet more specifically, the invention relates to the sports domain and especially to boots for skiing, cross country skiing, cycling, hiking, walking or other.

2. Discussion of Background and Material Information

In U.S. Pat. No. 3,564,670, the prior art discloses a lace locking mechanism, by wedging the strands of the lace between a mobile wheel and two convergent paths, a mechanism in which a force exerted by a user causes displacement of the wheel to block the strands in the paths.

The use of this mechanism first makes the user exert a tension on the lace with one hand, then lower the locking mechanism and finally, displace a locking wheel up to the wedging position with the other hand.

This functional mode therefore constitutes a problem, on the one hand, because locking is inadequate as long as the wheel is not properly positioned, on the other hand, because the maneuver is difficult, not very precise, and can especially cause a loss of tension of the laces during locking, and finally, because it may be necessary to displace the wheel before displacing the locking device.

In German Patent No. DE 19 24 757, the prior art also discloses a mechanism for locking laces by means of a wedging effect between a pin and a path where the laces are arranged, and in which the pin, translationally mobile only along an axis of symmetry of the locking mechanism, is permanently maintained in contact with the laces by a spring.

The problem with this known mechanism is that a difference of traction force between the laces generates sliding of the pin with respect to the laces and prevents locking of said laces.

SUMMARY OF THE INVENTION

The object of the present invention is to overcome these disadvantages and to propose a locking device of a simple and inexpensive design, capable of being easily actuated without risk of undesired jamming of the locking member and guaranteeing a perfect wedging of the strands of the lace under any circumstances.

This object is attained by the invention which proposes a solution constituted by a locking device which acts by wedging one or several laces, but where the locking member, of a circular shape and rotationally free about a translationally mobile axis, is elastically biased in the direction of the locking of the laces by action of elastic means along its axis of rotation. Thus, although being elastically biased, the locking member remains rotationally free and enables balancing of the tensions along the two strands of the lace, even in the case of a difference between the forces exerted on said laces.

Therefore, locking is always obtained. Furthermore, the fact that the locking member is permanently biased in the locking direction enables the tightening operation to be simplified since, in order to obtain the desired tightening effect, it suffices to displace the locking member along the lace(s) until the desired tightening tension is obtained.

BRIEF DESCRIPTION OF THE DRAWINGS

The object of the invention will be better understood with reference to the following description, together with the attached, annexed drawings arranged in the following manner.

FIGS. 5 is sectional view of the locking device in the lace wedging position along the contact lines of the laces and paths.

FIGS. 6 is view, similar to FIG. 5, of the locking device in the lace non-locking position.

DETAILED DESCRIPTION OF THE PREFERRED EMBODIMENTS

Figure 1:
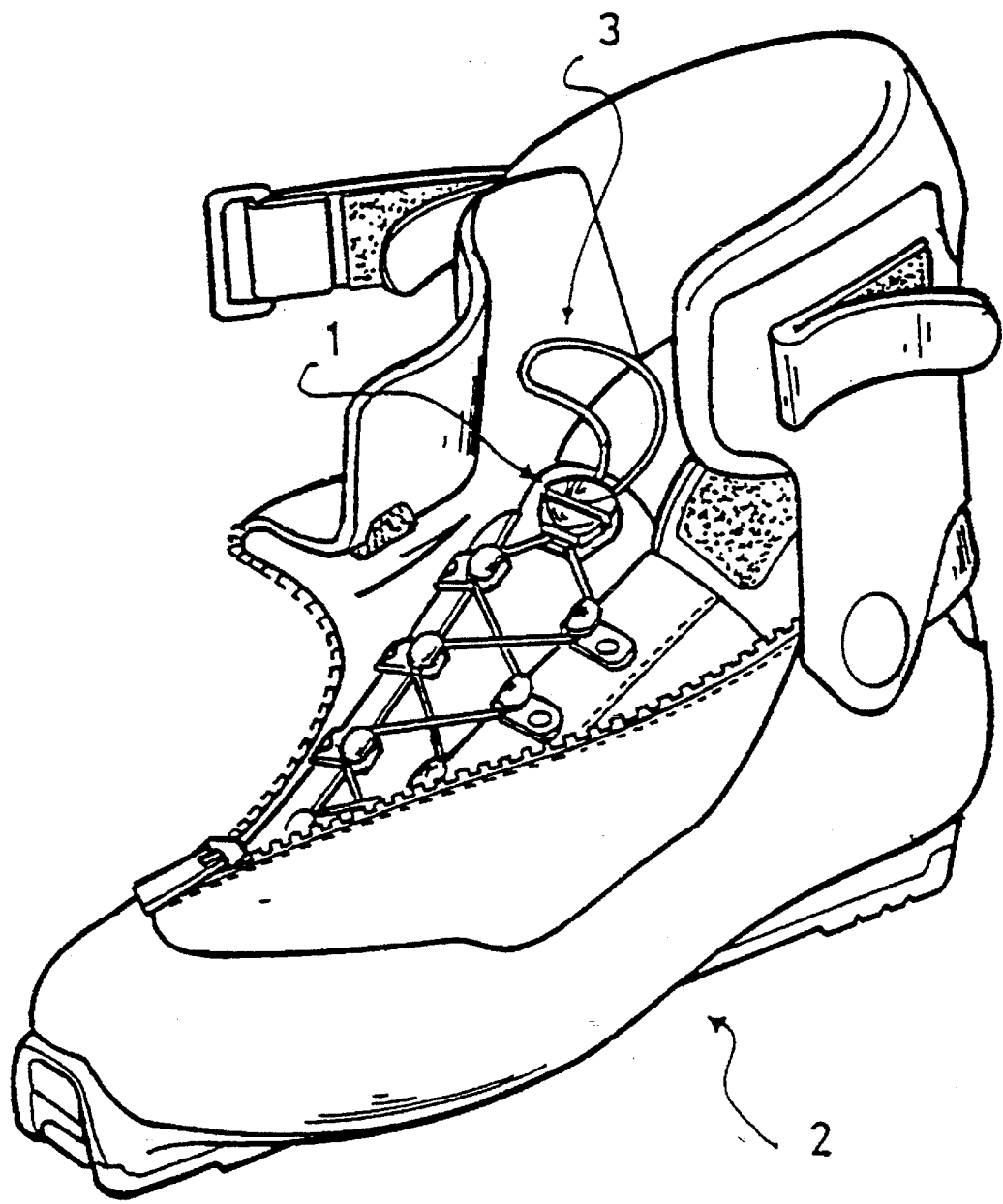
FIGS 1 is a comprehensive view of a boot, especially comprising a lace and a locking device according to the invention.

The described invention is a lace locking device or blocker 1, shown in FIG. 1 in an example of application to a cross country ski boot 2, for blocking a lace 3.

Figure 2:
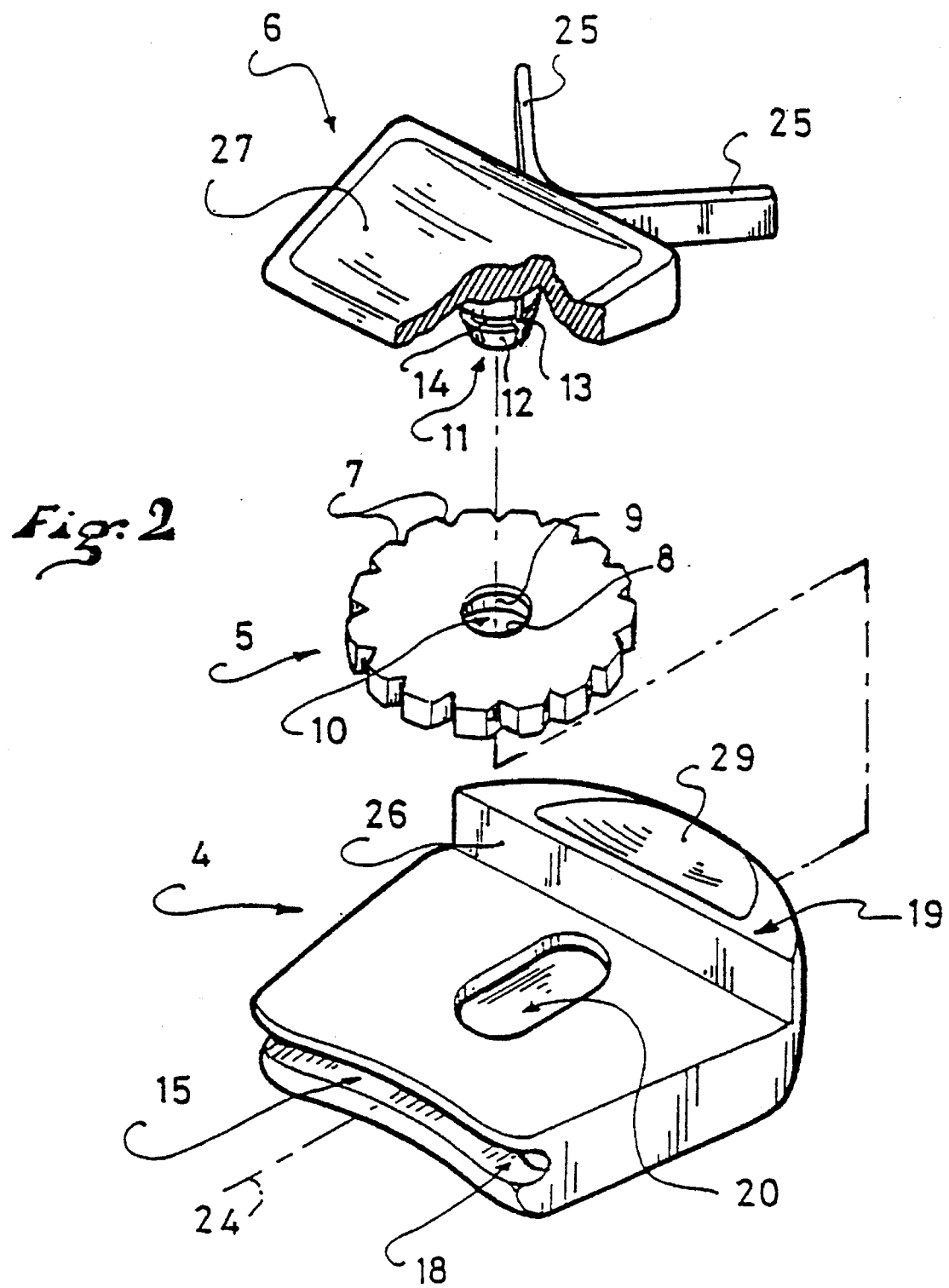
FIGS. 2 is an exploded perspective view of the locking device of FIG. 1.

As is shown more specifically in FIG. 2, locking device 1 is composed of three elements, a body 4, a circular-shaped locking member 5 and a pusher 6 which is located on the outside of body 4 and connected to locking member 5 for actuation thereof.

Preferably, locking member 5 is constituted by a wheel equipped with teeth 7 along its periphery.

The center of wheel 5 is pierced by a hole 8 aligned at a countersink 9 to define an eyelet 10 for a ratchet reception of an axle 11 of the pusher, which will constitute the axis of rotation of wheel 5. Axle 11, which is circular and originates directly from the pusher, has an outgoing side 12 intended for connection with wheel 5.

This side is equipped with an axial slit 13 along a portion of its length and is hollowed by a peripheral receiving groove 14 intended to receive wheel 5.

The end of the outgoing side is shaped like a truncated cone.

This structure enables the ratchet assembly of wheel 5 on axle 11. Body 4, as shown in FIG. 5, inwardly comprises a cavity intended to house the toothed wheel 5 and, as will be seen later, define two paths 16 for passage and wedging of the strands of lace 17.

In order to mount locking device 1 in body 4, wheel 5 is positioned inside cavity 15 of body 4 by passing through an opening 18 provided at an axial end of this body, and the pusher is locked by its eyelet 10 in wheel 5 while crossing the wall of the upper surface 19 of body 4 through a slit 20 arranged in this upper surface 19, along an axial longitudinal direction of the body.

Figure 3:
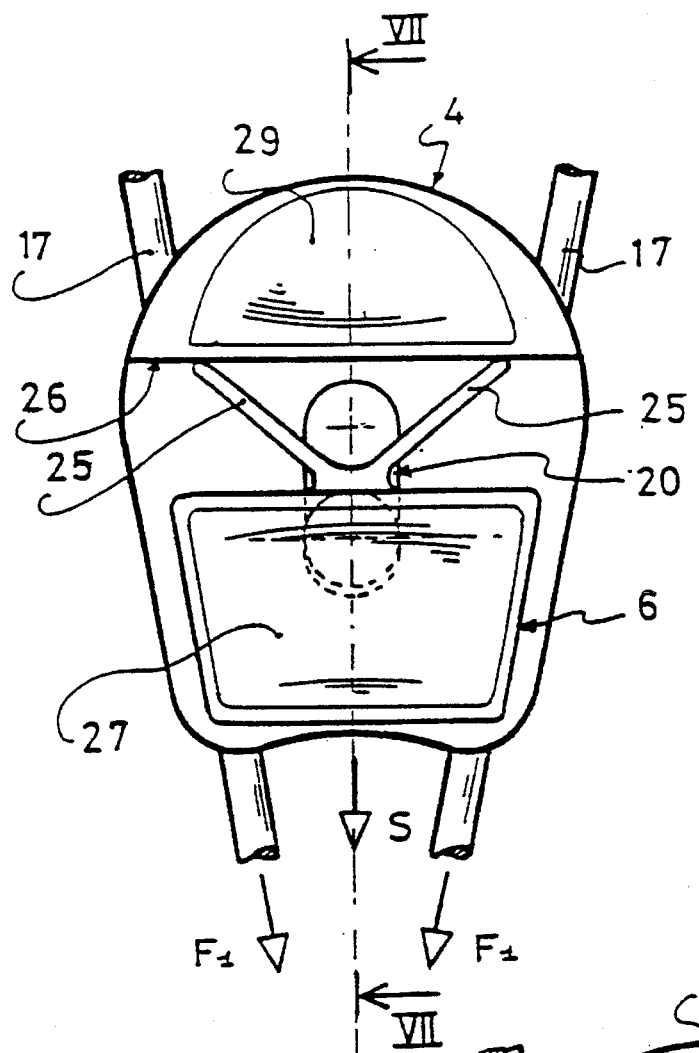
FIGS. 3 is an external view of the top of the locking device in the lace wedging position.

Thus mounted, pusher 6 is translationally mobile with respect to body 4, in slit 20 and in the longitudinal direction of said body 4, along the directions of arrows "L" or "S", shown, for example in FIG. 3.

The dimensions of groove 14 and hole 8 of wheel 5 are provided such that wheel 5 is mounted rotationally free about axle 11.

FIGS. 5, 6, 7 and 8 more specifically show the embodiment of paths 16 and the cooperation of locking member or wheel 5 therewith.

Paths 16 are located in cavity 15 along each of the two lateral surfaces 21 of body 4, and comprise serrations 22.

Figure 8:
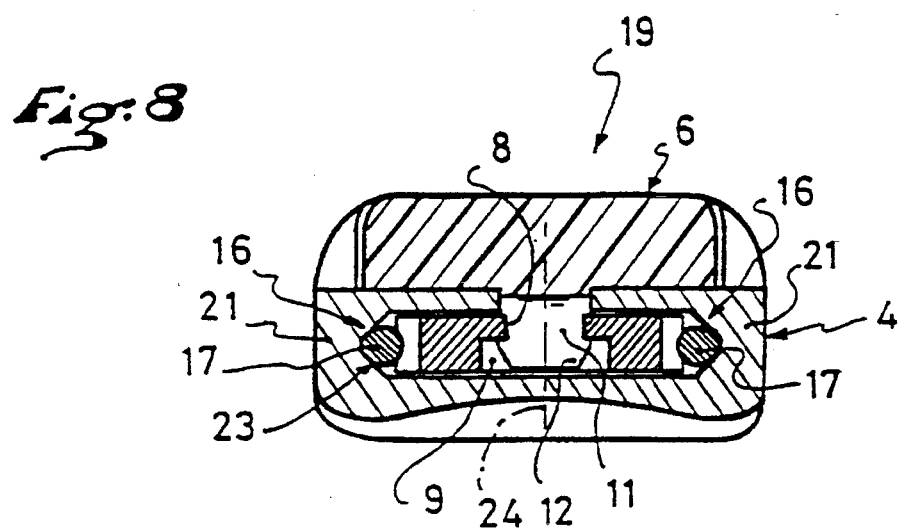
FIGS. 8 is a sectional view of the locking device along VIII of FIG. 7.

In order to receive the laces, paths 16 have a groove-shaped section which can be rounded or formed of straight segments 23, as shown in FIG. 8.

As shown in FIGS. 5 and 6, paths 16 are substantially rectilinear and their non-parallel directions converge to intersect on the axis of symmetry 24 of locking device 1 in the direction "S".

There are two end positions of pusher 6, one corresponding to the locking, and the other to the complete loosening of lace 3.

The locking position is especially shown in FIGS. 1, 3, 5, 7 and 8.

As shown in FIG. 5, wheel 5, which is permanently biased in the "S⇆" direction in the locking position, tightens the strands of laces 17 by pressing the latter to the bottom of paths 16 of body 4.

The locking of the strands of the laces 17 is thus obtained by a wedging effect via the cooperation of paths 16 and wheel 5.

The advantage provided by the wedge-effect locking is that the tightening value of the strands of laces 17 by wheel 5 is in proportion to the traction forces exerted on the strands, and results only from these forces.

Another advantage, connected to the fact that wheel 5 is rotationally free about axle 11, is that a difference in the traction forces on both strands of laces 17 does not cause jamming of the system or relative sliding of one of the strands with respect to locking member 5.

As per the invention, shown especially in FIGS. 2, 3, 4 and 7, an elastic means is also incorporated into locking device 1.

The elastic means is constituted by two elastic tongues 25 which extend in a V-shape from the center of pusher 6 and whose free ends are provided so as to take support on a projecting surface 26 formed by the body 4 to bias pusher 6 in locking direction 5 as shown in FIG. 3.

Therefore, these tongues 25 also bias wheel 5 in the locking direction "S" by means of its axle 11 which is affixed to pusher 6.

Thus, locking member 5 is elastically biased in the locking direction of laces 17 by means of its axis of rotation 11.

As per a preferred embodiment of the invention, axle 11, pusher 6 and tongues 25 form one single element.

The elements and operation described hereinabove provide, compared to the prior art, the advantage of having a precise and immediate lace blocking without requiring external action on locking member 5.

Figure 4:
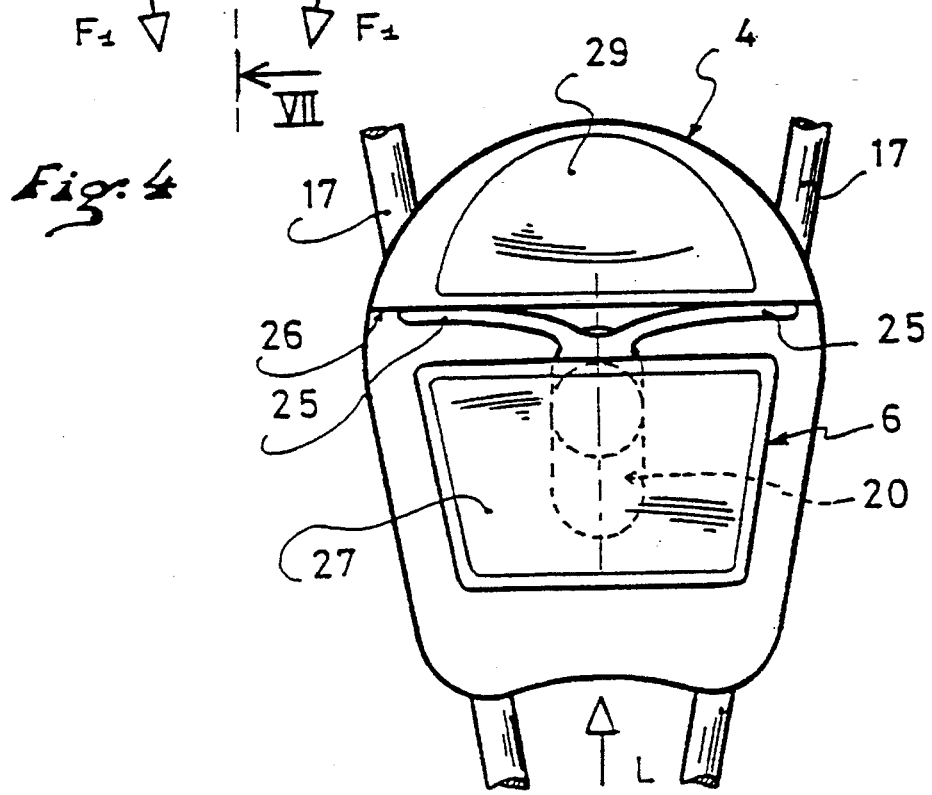
FIGS. 4 is an external view, similar to FIG. 3, of the locker in lace non-locking position.

On the contrary, as shown for example in FIG. 4, an external action on pusher 6 in the direction of arrow "L", for causes a relative displacement of said pusher 6 with respect to body 4.

Figure 7:
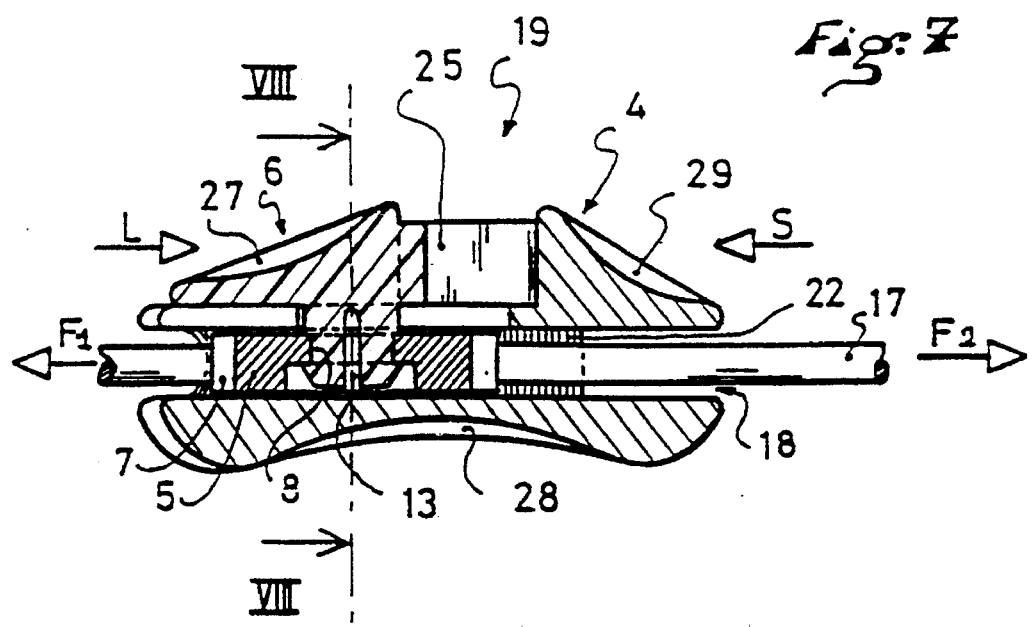
FIGS. 7 is a sectional view of the locking device along VII of FIG. 3.

On its visible upper surface, pusher 6 has a cavity or depression 27 shown in FIG. 7, whose shape corresponds substantially to that of a finger exerting a force in the direction "L" for unlocking the system.

Consequently, a user can easily act on pusher 6 in the direction of arrow "L" with one finger taking support in cavity 27 of said pusher 6.

In order to obtain the unlocking, the finger action must be exerted against the elastic force exerted by tongues 25 on pusher 6.

Since axis 11 is connected to pusher 6, wheel 5, guided by axle 11, is spaced from the convergence point of the directions of paths 16.

The wedging effect no longer occurs and unlocking is obtained.

The advantage is that the unlocking as per the invention is obtained by an easy manipulation.

Similarly, as shown especially in FIGS. 7 and 8, body 4 has cavities or depressions 28 and 29 respectively on its upper and lower surfaces, intended to facilitate ergonomic engagement of the body during locking.

The shapes of cavities 28 and 29 of body 4 each correspond substantially to that of a finger, oriented so as to exert a force in the direction "L", Therefore, it is easier for the user to pull on lace 3 with one hand and push on locking device 1 with the other hand, to displace the latter on the lace up to the desired locking position.

Once this locking position is attained, it suffices to release locking device 1 without having to exert any other action on the wedging element or pusher, to obtain the desired tightening; wheel 5, biased by tongues 25, automatically exerting the desired wedging effect.

The advantage is that here again, the manipulation is easier.

A preferred embodiment of the invention calls for three elements, i.e., body 4, wheel 5 and pusher 6.

These elements are preferably made of plastic although other materials are suitable.

Additional advantages result from the embodiment, especially a light and simple assembly, good longevity, reduced maintenance, good reliability and a very low production cost.

The instant application is based upon French patent application 93.07715 of Jun. 21, 1993, the disclosure of which is hereby expressly incorporated by reference thereto, and the priority of which is hereby claimed.

Finally, although the invention has been described with reference of particular means, materials and embodiments, it is to be understood that the invention is not limited to the particulars disclosed and extends to all equivalents within the scope of the claims.

What is claimed:

1. A locking device for at least one strand, said device comprising:

a generally circular locking member;

a hollow body comprising a respective path for each said strand for entry into and exit from said hollow body, said hollow body further comprising a housing for said locking member;

a pusher;

an axle unitary with said pusher, said locking member being mounted for rotation about said axle; and means for elastically biasing said pusher and said axle for translation of said locking member in a locking direction with respect to said hollow body to lock said strand by wedging said strand within said hollow body, said elastically biasing means being unitary with said pusher and said axle and being in supporting engagement with a projecting surface of said hollow body.

2. A locking device according to claim 1, wherein:

said pusher is mounted for movement along an exterior surface of said hollow body, said axle extending through an opening in said hollow body, said opening being elongated for enabling translation of said axle and said translation of said locking member.

3. A locking device according to claim 2, wherein:

said elastically biasing means is positioned externally of said housing of said hollow body and extends between said pusher and a portion of said hollow body.

4. A locking device for at least one strand, said device comprising:

a generally circular locking member;

a hollow body comprising a respective path for each said strand for entry into and exit from said hollow body, said hollow body further comprising a housing for said locking member;

a pusher;

an axle unitary with said pusher, said locking member being mounted for rotation about said axle; and means for elastically biasing said pusher and said axle for translation of said locking member in a locking direction with respect to said hollow body to lock said strand by wedging said strand within said hollow body, said elastically biasing means being constituted by two tongues extending from said pusher in a V-shape, said two tongues having free ends in supporting engagement with a projecting surface of said hollow body.

5. A locking device according to claim 4, wherein:

said pusher is mounted for movement along an exterior surface of said hollow body, said axle extending through an opening in said hollow body, said opening being elongated for enabling translation of said axle and said translation of said locking member.

6. A locking device according to claim 4, wherein:

said pusher comprises a surface depression corresponding substantially to the shape of a finger for facilitating engagement with said finger.

7. A locking device according to claim 4, wherein:

said elastically biasing means is positioned externally of said housing of said hollow body and extends between said pusher and a portion of said hollow body.

8. A locking device for at least one strand, said device comprising:

a generally circular locking member and an axle for supporting said locking member for rotation;

a hollow body comprising a respective path for each said strand and comprising a housing for said locking member, said housing comprising means for supporting said axle for enabling rotation and translation of said locking member, said path being defined by said locking member and a portion of said hollow body; and means for elastically biasing said locking member for movement in said translation in a locking direction for wedging said strand between said locking member within said hollow body, said means for biasing exerting a biasing force via said axle and not directly against said locking member.

9. A locking device according to claim 8, wherein:

said axle is unitary with said means for biasing; and said locking member is mounted for free rotation about said axle.

10. A locking device according to claim 8, wherein:

said axle comprises a truncated conical end portion having a longitudinal slit and a peripheral groove for locking said locking member on said axle.

11. A locking device according to claim 8, wherein:

a pusher is affixed to said axle and is positioned exteriorly of said hollow body for manipulation by a user;

said axle extends from said pusher through an opening in said hollow body to said locking member.

12. A locking device according to claim 11, wherein:

said means for biasing is supported against a projecting surface of said hollow body for exerting said biasing force to said axle via said pusher.

13. A locking device according to claim 8, wherein:

said pusher comprises a surface depression corresponding substantially to the shape of a surface of a finger for facilitating engagement with said finger.

14. A locking device according to claim 8, wherein:

said locking member has peripheral teeth to constitute a toothed wheel.

15. A locking device according to claim 8, wherein:

each said respective path of said hollow body comprises serrations for engagement with a respective strand.

16. A locking device according to claim 8, wherein:

said hollow body comprises an upper exterior surface and a lower exterior surface, each of said upper and lower exterior surfaces includes a depression corresponding substantially to the shape of a surface of a finger for facilitating engagement with said finger.

17. A locking device according to claim 8, wherein:

said at least one stand comprise two strands;

said respective path for each said strand comprises a path for each of said two strands, each said path being positioned on opposite sides of said locking member and being defined by said locking member and respective opposite portions of said hollow body.

18. A locking device according to claim 8 in combination with a shoe having lace, whereby said at least one strand is a strand of said lace, said locking device comprising a means for closing and tightening said shoe upon a foot.

19. A locking device for at least one strand, said device comprising:

a generally circular locking member and an axle for supporting said locking member for rotation;

a hollow body comprising a respective path for each said strand and comprising a housing for said locking member, said housing comprising means for supporting said axle for enabling rotation and translation of said locking member, said path being defined by said locking member and a portion of said hollow body;

a pusher mounted for translation along a surface of said hollow member external of said housing of said hollow member; and means for elastically biasing said locking member for movement in said translation in a locking direction for wedging said strand between said locking member within said hollow body, said means for biasing being mounted external of said housing of said hollow body for exerting a biasing force against said pusher.

* * * * *